United States Patent
Lee et al.

(10) Patent No.: US 9,508,247 B2
(45) Date of Patent: Nov. 29, 2016

(54) SYSTEMS AND METHODS OF AUTOMATED ARMING AND DISARMING OF A SECURITY SYSTEM

(71) Applicant: Google Inc., Mountain View, CA (US)

(72) Inventors: Jeffery Theodore Lee, Los Gatos, CA (US); Anthony Michael Fadell, Woodside, CA (US); Sophie Le Guen, Burlingame, CA (US); Maxime Veron, Los Altos, CA (US); Mark Rajan Malhotra, San Mateo, CA (US); Timo Bruck, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/585,278

(22) Filed: Dec. 30, 2014

(65) Prior Publication Data

US 2016/0189529 A1    Jun. 30, 2016

(51) Int. Cl.
| | | |
|---|---|---|
| *G08B 13/00* | (2006.01) | |
| *G08B 25/00* | (2006.01) | |
| *H04W 4/02* | (2009.01) | |
| *G08B 21/22* | (2006.01) | |

(52) U.S. Cl.
CPC .............. *G08B 25/008* (2013.01); *G08B 21/22* (2013.01); *H04W 4/02* (2013.01)

(58) Field of Classification Search
CPC ............................... G08B 25/008; H04W 4/02
USPC ......................................................... 340/541
See application file for complete search history.

(56) References Cited

U.S. PATENT DOCUMENTS

| | | |
|---|---|---|
| 3,836,901 A | 9/1974 | Matto et al. |
| 4,794,368 A | 12/1988 | Grossheim et al. |
| 5,412,371 A | 5/1995 | Kaplan et al. |
| 7,030,739 B2 | 4/2006 | DiCroce |
| 7,081,813 B2 | 7/2006 | Winick et al. |
| 7,696,873 B2 | 4/2010 | Sharma et al. |
| 7,741,969 B2 | 6/2010 | Linford |
| 2004/0145458 A1* | 7/2004 | DiCroce ............ B60R 25/1003 340/426.1 |
| 2007/0247302 A1* | 10/2007 | Martin ................. G08B 25/008 340/506 |
| 2008/0068162 A1* | 3/2008 | Sharma ................ G08B 25/008 340/545.1 |
| 2008/0120402 A1 | 5/2008 | Brown et al. |

(Continued)

FOREIGN PATENT DOCUMENTS

| | | |
|---|---|---|
| EP | 1686551 A2 | 8/2006 |
| EP | 1912180 A2 | 4/2008 |

OTHER PUBLICATIONS

International Search Report and the Written Opinion of the International Searching Authority for PCT/US2015/61397 dated Feb. 3, 2016.

*Primary Examiner* — Juan A Torres
(74) *Attorney, Agent, or Firm* — Morris & Kamlay LLP

(57) ABSTRACT

Systems and methods of security are provided, including at least one of a plurality of sensors to detect a location of at least one user, and generate detection data according to the detected location of the at least one user. A processor may be communicatively coupled to the at least one of the plurality of sensors to receive the detection data and to determine whether the at least one user is occupying a building according to the detection data. An alarm device, communicatively coupled to the processor, can be armed or disarmed by the processor according to the determination as to whether the at least one user is occupying the building.

33 Claims, 6 Drawing Sheets

(56) References Cited

U.S. PATENT DOCUMENTS

| | | | | |
|---|---|---|---|---|
| 2008/0238669 A1* | 10/2008 | Linford | ............... | E05B 45/06 340/542 |
| 2010/0289644 A1 | 11/2010 | Slavin et al. | | |
| 2012/0066168 A1* | 3/2012 | Fadell | ............... | G05B 15/02 706/52 |
| 2012/0186774 A1* | 7/2012 | Matsuoka | ............... | G05B 15/02 165/11.1 |
| 2014/0313032 A1 | 10/2014 | Sager et al. | | |

\* cited by examiner

SYSTEMS AND METHODS OF AUTOMATED ARMING AND DISARMING OF A SECURITY SYSTEM

BACKGROUND

Traditional home security systems must be armed by a user prior to leaving a home, and must be disarmed by a user after entering the home. Typically, a user has a preset time, such as 30 seconds, to exit the home once the home security system has been armed, and the same amount of time to disarm the home security system once the user returned and entered the home. As the time requirement associated with arming and disarming the home security system is difficult for the user to adhere to, or the security system is difficult to use, the user may choose not to arm the home security system when the user leaves. Moreover, the user of traditional systems may generate unwanted alarms if the user attempts to re-enter the home after the preset time to exit is expired, which causes inconvenience, and can lead the user to choose to not arm the security system. Additionally, the user of a traditional home security system can forget to arm the home security system before leaving the home, thus leaving the home unsecure.

BRIEF SUMMARY

Embodiments of the disclosed subject matter provide automated security methods and systems to determine when a user has exited a home, and arm the security system accordingly. The security system disclosed herein may determine when the user has arrived home, and disarm the security system. The security system can determine when to arm or disarm an alarm device according to occupancy of the home, geo-location data, a user's electronic device location (e.g., the location of a user's smartphone, smart watch, wearable computing device, key FOB, RFID tag, fitness band, and the like), sensor data (e.g., motion sensors, cameras, door detection, window detection, and the like), and aggregated data regarding the times and days of the user's presence in the home. The security methods and systems disclosed herein may transition from a first security state to a second security state, where the second security state provides greater security than the first security state. The security system disclosed herein may transition to the second security state when it is determined that the home has been unoccupied for a predetermined period of time.

According to an embodiment of the disclosed subject matter, a security system is provided that includes a sensor to detect a location of at least one user, and generate detection data according to the detected location of the at least one user, a processor communicatively coupled to the sensor to receive the detection data and to determine whether the at least one user is occupying a building according to the detection data, and an alarm device, communicatively coupled to at least the processor, that is armed or disarmed by the processor according to the determination as to whether the at least one user is occupying the building.

According to an embodiment of the disclosed subject matter, a method is provided that includes detecting, by a sensor, a location of at least one user, and generating detection data according to the detected location of the at least one user, receiving, by a processor communicatively coupled to the sensor, the detection data and determining whether the at least one user is occupying a building according to the detection data, and arming an alarm device that is communicatively coupled to the processor according to the determination as to whether the at least one user is occupying the building.

According to an embodiment of the disclosed subject matter, means for security system automation are provided, including detecting, by a sensor, a location of at least one user, and generating detection data according to the detected location of the at least one user, receiving, by a processor communicatively coupled to the at least one of the plurality of sensors, the detection data and determining whether the at least one user is occupying a building according to the detection data, and arming an alarm device that is communicatively coupled to the processor according to the determination as to whether the at least one user is occupying the building.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
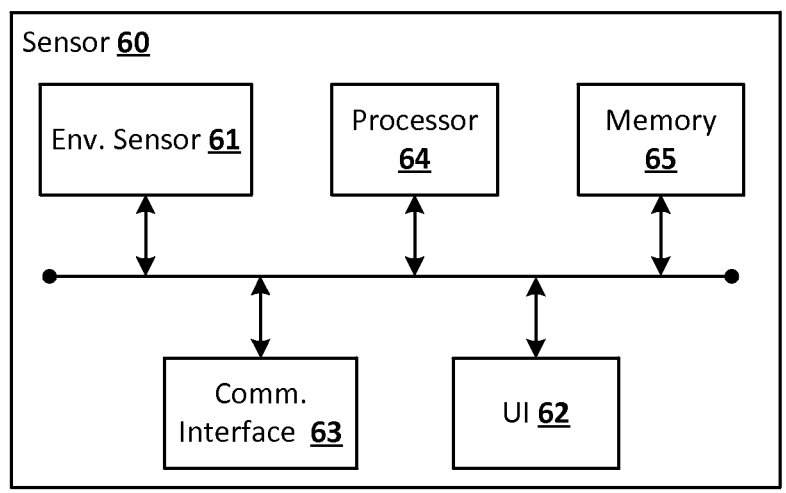
FIG. 1 shows an example sensor according to an embodiment of the disclosed subject matter.

Embodiments of the disclosed subject matter provide automated security methods and systems to determine when a user has entered or exited a building, such as a home, and arm or disarm the security system accordingly. That is, the security system disclosed herein may determine whether the user located within the home or building (or a predefined area around the home or building), and/or outside of the home. The security system disclosed herein can determine when to arm or disarm an alarm device according to occupancy of the home, geo-location data, a location of a user's electronic device (e.g., a user's smartphone, smart watch, wearable computing device, key FOB, or the like), sensor data, and aggregated data regarding the times and days of the user's presence in the home. The security methods and systems disclosed herein may transition from a first security state to a second security state, where the second security state provides greater security than the first security state. The security system disclosed herein may transition to the second security state when it is determined that the home has been unoccupied for a predetermined period of time.

As the automated security system may be set by a user and/or "learned" from the user's history with the security system, the arming and/or disarming of the alarm device of the security system may be easy for the user, as it is personalized to the user and/or members of the user's household. That is, the security system can be personalized according to the location of a user and/or members of a user's household, such as being in a location within the home and/or outside the home. The embodiments disclosed herein may provide that the security system that reduces the number of false alarms, due to the personalization and system learning of the user's entry and exit. That is, the embodiments of the disclosed subject matter may provide systems and methods to provide allowances for entry and exiting of a home or building that are personalized and flexible, and that minimize unauthorized entry and false alarms.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, carbon dioxide, laser, sound, proximity, temperature, time, physical orientation, acceleration, location, entry, presence, and the like. A sensor can include, for example, a camera, a retinal camera, and/or a microphone.

A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

A sensor may include hardware in addition to the specific physical sensor that obtains information about the environment. FIG. 1 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices.

A user interface (UI) 62 may provide information (e.g., via a display device or the like) and/or receive input from a user of the sensor. The UI 62 may include, for example, a speaker to output an audible alarm and/or message when an event is detected by the sensor 60. The speaker may output a message to an authorized user regarding the operational status (e.g., there are no security and/or environmental events, an operational issue has been detected, and/or a security event and/or environmental event has been detected) of the security system disclosed herein, when, for example, the user arrives at the building (e.g., the user's home, the user's office, or the like), or when the user exits the building. The speaker may output an audible message for a user to access information regarding the operational status of the security system, for example, when the user arrives at the building (e.g., a home, an office, or the like) via an application installed and/or accessible from an electronic device (e.g., device 75 illustrated in FIG. 2B and/or computing device 20 illustrated in FIG. 5). Alternatively, or in addition, the UI 62 may include a light to be activated when an event is detected by the sensor 60. The user interface may be relatively minimal, such as a limited-output display, or it may be a full-featured interface such as a touchscreen.

Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Faults and/or other issues with sensors may be reported to the central controller. If the communications network that the sensors and the central controller are part of experiences connectivity issues, data to authenticate users so as to allow entry, and/or arming and/or disarming of the security system may be stored at individual sensors that may serve as access points to the home and/or building. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 2A:
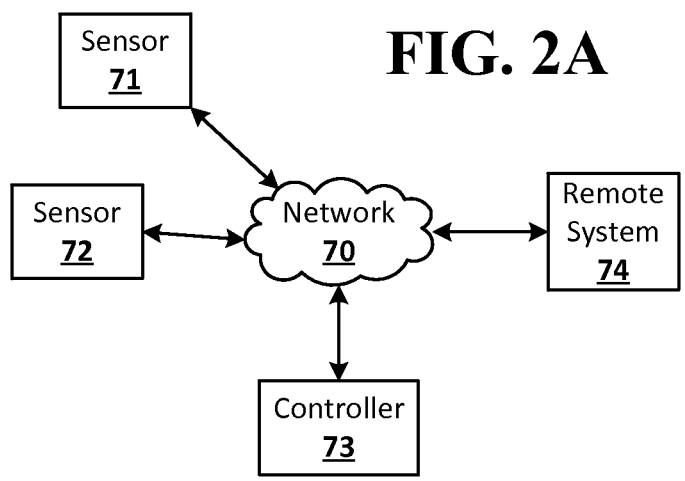
FIGS. 2A-2B show a security system having a sensor network according embodiments of the disclosed subject matter.
Figure 2B:
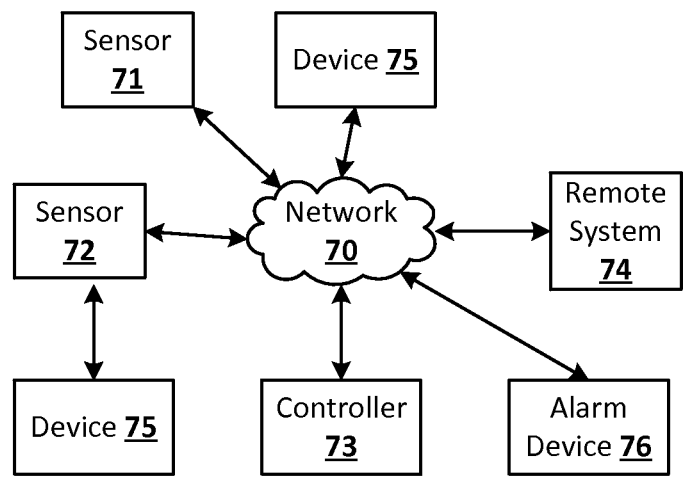

FIGS. 2A-2B show examples of a security system having a sensor network as disclosed herein, which may be implemented over any suitable wired and/or wireless communication networks. One or more sensors 71, 72 may communicate via a local network 70, such as a Wi-Fi or other suitable network, with each other and/or with a controller 73.

FIGS. 2A-2B show an example of a security system and/or smart-home network as disclosed herein, which may be implemented over any suitable wired and/or wireless communication networks. One or more sensors 71, 72 may communicate via a local network 70, such as a Wi-Fi or other suitable network, with each other and/or with a controller 73. The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The controller 73 shown in FIGS. 2A-2B may be communicatively coupled to the network 70 and may be and/or include a processor. Alternatively, or in addition, the controller 73 may be a general- or special-purpose computer. The controller 73 may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors 71, 72 may communicate directly with a remote system 74. The remote system 74 may, for example, aggregate data from multiple locations, provide instruction, software updates, and/or aggregated data to a controller 73 and/or sensors 71, 72.

The sensor network shown in FIGS. 2A-2B may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart-home environment can control and/or be coupled to devices outside of the structure. For example, one or more of the sensors 71, 72 may be located outside the structure, for example, at one or more distances from the structure (e.g., sensors 71, 72) may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIGS. 2A-2B may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIGS. 2A-2B.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIGS. 2A-2B, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIGS. 2A-2B, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIGS. 2A-2B may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIGS. 2A-2B. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIGS. 2A-2B. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIGS. 2A-2B can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIGS. 2A-2B can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, smart watch, wearable computing device, a tablet, a key FOB, a radio frequency and the like). A webpage or application can be configured to receive communications from the user and control the one or more of the network-connected smart devices based on the communications and/or to present information about the device's operation to the user. For example, the user can view the webpage and/or the application, and can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. The smart-home environment may provide notifications to users when there is an attempt to use network-connected smart devices in a manner that is atypical from the learned pattern of usage. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event any of the network-connected smart devices, such as smart wall plugs located outdoors, detect movement at night time, the controller 73 and/or remote system 74 can activate the outdoor lighting system and/or other lights in the smart-home environment.

The one or more sensors 71, 72 shown in FIGS. 2A-2B may be magnetic field sensors that detect a security event when a door and/or window of a building having the security system disclosed herein has been opened and/or compromised. In yet another example, the one or more sensors 71, 72 may be a smoke sensor and/or a carbon monoxide sensor that detect an environmental event when smoke is sensed and/or carbon monoxide is sensed.

In embodiments of the disclosed subject matter, the remote system 74 shown in FIGS. 2A-2B may be a law enforcement provider system, a home security provider system, a medical provider system, and/or a fire department provider system. When a security event and/or environmental event is detected by at least one of one sensors 71, 72, a message may be transmitted to the remote system 74. The content of the message may be according to the type of security event and/or environmental event detected by the sensors 71, 72. For example, if smoke is detected by one of the sensors 71, 72, the controller 73 may transmit a message to the remote system 74 associated with a fire department to provide assistance with a smoke and/or fire event (e.g., request fire department response to the smoke and/or fire event). Alternatively, the sensors 71, 72 may generate and transmit the message to the remote system 74. In another example, when one of the sensors 71, 72 detects a security event, such a window or door of a building being compromised, a message may be transmitted to the remote system 74 associated with local law enforcement to provide assistance with the security event (e.g., request a police department response to the security event).

The controller 73 and/or the remote system 74 may include a display to present an operational status message (e.g., a security event, an environmental event, an operational condition, or the like), according to information received from at least one or the sensors 71, 72. For example, the display of the controller 73 and/or remote system 74 may display the operational status message to a user while the user is away from the building having the security system disclosed herein. Alternatively, or in addition, the controller 73 may display the operational status message to a user when the user arrives at and/or departs (i.e., exits) from the building. For example, one or more sensors may identify and authenticate the user (e.g., using images captured by the sensor, and comparing them with pre-stored images, and/or according to identifying information from the device of a user, such as a smartphone, smart watch, wearable computing device, key FOB, RFID tag, or the like), and the security system may display the operational status message.

FIG. 2B shows a security system as disclosed herein that includes an alarm device 76, which may include a light and an audio output device. The alarm device 76 may be controlled, for example, by controller 73. The light of the alarm device 76 may be activated so as to be turned on when one or more sensors 71, 72 detect a security event and/or an environmental event. Alternatively, or in addition, the light may be turned on and off in a pattern (e.g., where the light is turned on for one second, and off for one second; where the light is turned on for two seconds, and off for one second, and the like) when one or more sensors 71, 72 detect a security event and/or an environmental event. Alternatively, or in addition, an audio output device of the alarm device 76 may include at least a speaker to output an audible alarm when a security event and/or an environmental event is detected by the one or more sensors 71, 72. For example, a security event may be when one or more sensors 71, 72 are motion sensors that detect motion either inside a building having the security system disclosed herein, or within a predetermined proximity to the building. The speaker of the alarm device 76 may, for example, output a message when the user arrives at the building or departs from the building according to the operational status of the security system (e.g., a security and/or environmental event has been detected, an operational issue with the security system has been detected, the security system has been armed and/or disarmed, or the like).

Figure 5:
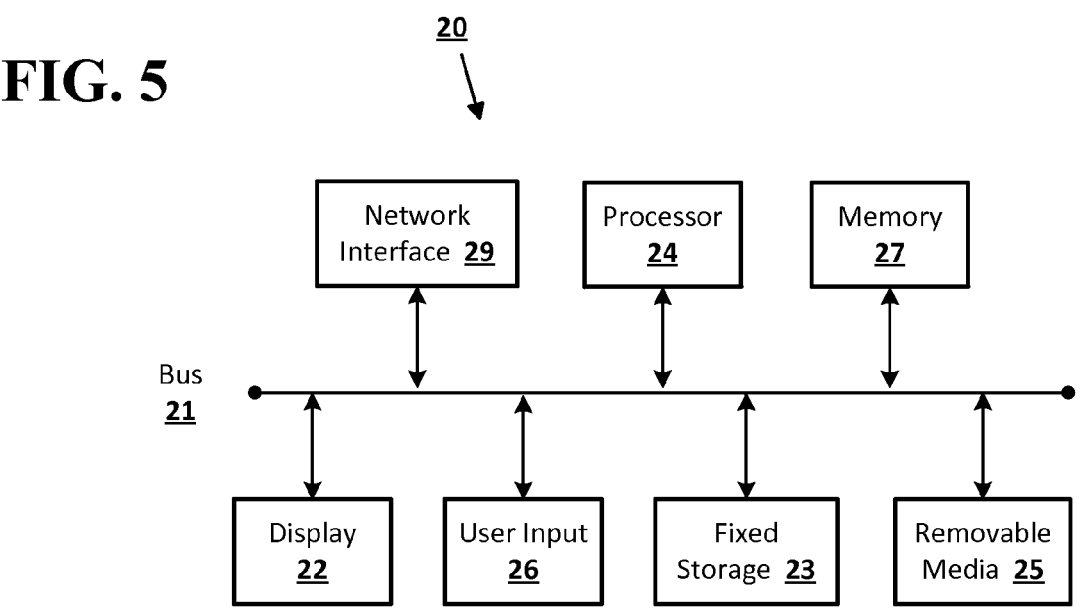
FIG. 5 shows an electronic device according to embodiments of the disclosed subject matter.

FIG. 2B shows a device 75 that may be communicatively coupled to a sensor. Although FIG. 2B illustrates that device 75 is coupled to sensor 72, the device 75 may be communicatively coupled to sensor 71 and/or sensor 72. The device 75 may be a computing device as shown in FIG. 5 and described below, and/or a key FOB. A user of the security system disclosed herein may control the device 75. When the device 75 is within a predetermined distance (e.g., one foot, five feet, 10 feet, 20 feet, 100 feet, or the like) from the sensor 72, the device 75 and the sensor 72 may communicate with one another via Bluetooth signals, Bluetooth Low Energy (BTLE) signals, Wi-Fi pairing signals, near field communication (NFC) signals, radio frequency (RF) signals, infra-red signals, and/or short-range communication protocol signals. For example, the user may present the device 75 within the predetermined distance range of the sensor so that the device 75 and the sensor may communicate with one another. The device 75 may provide identifying information to the sensor 72, which may be provided to the controller 73 to determine whether the device 75 belongs to an authorized user of the security system disclosed herein. The controller 73 may monitor the location of the device 75 in order to determine whether to arm or disarm the alarm device 76. The controller 73 may arm or disarm the alarm device 76 according to, for example, whether the device 75 is within a home, building, and/or a predetermined area. The predetermined area may be defined, for example, according to, for example, geo-fencing data, placement and/or range of sensors 71, 72, a defined distance from the building having the security system disclosed herein, and the like.

In example embodiments of the disclosed subject matter, the device 75 may be associated with an authorized user. Authorized users may be those users, for example, who have identifying information stored and/or registered with the controller 73. Identifying information may include, for example, images of the user, voice recordings of the user, identification codes that are stored in a user's device, user PIN codes, and the like.

For example, when the authorized user and the device 75 are outside of the home, building, and/or predetermined area, the controller 73 may arm the alarm device 76. In determining whether to arm the alarm device 76, the controller may gather data from the sensors 71, 72, to determine whether any other person is in the building. When the alarm device 76 is armed, and the user and the device 75 return to the home, building, and/or predetermined area of the security system, the controller 73 may disarm the alarm device 76 according to the signals received by the sensors 71, 72 from the device 75. The exchanged signals may include the identifying information of the user.

In FIGS. 2A-2B, the sensor 71, 72 may be a camera to capture an image of a face of a person to be transmitted to the controller 73, where the controller 73 compares the captured facial image with a pre-stored image. When it is determined by the controller 73 that at least a portion of the captured facial image matches the pre-stored image, the controller 73 determines that the person is an authorized user of the security system disclosed herein. The controller 73 may arm or disarm the alarm device 76 according to the determination of whether the person is an authorized user.

The sensor 71, 72 may be a camera to capture a retinal image from a person to be transmitted to the controller 73, where the controller 73 compares the captured retinal image with a pre-stored image. When it is determined by the controller 73 that at least a portion of the captured retinal image matches the pre-stored image, the controller 73 determines that the person is an authorized user of the security system disclosed herein. The controller 73 may arm or disarm the alarm device 76 according to the determination of whether the person is an authorized user.

The sensor 71, 72 may be a microphone to capture a voice of a person to be transmitted to the controller 73, where the controller 73 compares the captured voice with a pre-stored voice. When it is determined by the controller 73 that at least a portion of the captured voice matches the pre-stored voice, the controller 73 determines that the person is an authorized user of the security system disclosed herein.

When the sensor 72 and/or the controller 73 determine that the device 75 is associated with an authorized user according to the transmitted identification information, the sensor 72 and/or the controller 73 provide an operational status message to the user via a speaker (i.e., audio output 77), a display (e.g., where the display is coupled to the controller 73 and/or remote system 74), and/or the device 75. The operational status message displayed can include, for example, a message that a security event and/or environmental event has occurred. When the sensors 71, 72 have not detected a security and/or environmental event, a message may be displayed that no security and/or environmental event has occurred. In embodiments of the subject matter disclosed herein, the device 75 may display a source of the security event and/or environmental event, a type of the security event and/or environmental event, a time of the security event and/or environmental event, and a location of the security event and/or environmental event.

In embodiments of the disclosed subject matter, the device 75 may be communicatively coupled to the network 70 so as to exchange data, information, and/or messages with the sensors 71, 72, the controller 73, and the remote system 74.

In embodiments of the disclosed subject matter, the controller 73 can request entry of an access code from the device 75 and/or a keypad communicatively coupled to the controller 73. Upon receipt of the access code, the security system disclosed herein may be disarmed, and/or may provide an operational status message to the user via a display coupled to the controller 73 and/or the device 75. Alternatively, or in addition, an operational status message may be output via a speaker of the alarm device 76.

For example, a preset time (e.g., 15 seconds, 30 seconds, 1 minute, 5 minutes, or the like) may be set for the security system to allow for a user to exit the home or building before arming the alarm device 76. A preset time may be set for the security system to allow for a user to enter the home and disarm the alarm device 76. The preset time for entry of the home and the preset time to exit the home may be the same amount of time, or can be set to provide different amounts of time. If a user needs more time to enter or exit the home with the security system, an electronic device of the user (e.g., a smartphone, smart watch, wearable computing device, radio frequency identification (RFID) tag, fitness band or sensor, a key FOB, or the like, such as device 75) can request, upon receiving input from the user, that the controller 73 provide additional time beyond the preset time to allow for the user to enter or exit the home. Alternatively, or in addition, the security system disclosed herein may extend the preset time to enter or exit. For example, the time may be extended for exiting the home while the user and/or the user's electronic device are in the home. That is, the sensors 71, 72 may determine that the user and/or the user's registered electronic device are in the home and are engaged in moving towards exiting, and the controller 73 may extend the preset time to exit. Alternatively, or in addition, the device 75 may transmit a command (e.g., when input is received from the user) to the controller 73 to disengage the exit process (e.g., the controller 73 and/or the alarm device 76 are disengaged from counting down the preset time before arming the alarm device 76).

In another example, when the user returns home, a preset time for entry to disarm the alarm device 76 may be extended according to whether the user has an electronic device (e.g., device 75, which may be a smartphone, smart watch, wearable computing device, RFID tag, fitness band or sensor, key FOB, or the like) that is registered with the controller 73. That is, the sensors, 71, 72 may detect the presence of the device 75 with the user, and may disarm the alarm device 76. When the sensors 71, 72 determine that the user does not have the device 75, the controller 73 may extend the preset time so that a user may be given additional time to enter a code on, for example, a keypad communicatively coupled to the controller 73, to disarm the alarm device 76.

As illustrated in FIGS. 2A-2B, a security system can include sensors (e.g., sensors 71, 72) to detect a location of at least one user, and generate detection data according to the detected location of at least one user of the security system. The detection data may be generated by the sensors 71, 72. For example, the at least one user may be one or more members of a household, and the security system may monitor their location using the sensors 71, 72 to determine whether to arm or disarm the alarm device 76. A processor, such as the controller 73 illustrated in FIGS. 2A-2B and described above, may be communicatively coupled to the sensors 71, 72, and can receive the detection data. The controller 73 can determine whether the at least one user is occupying a home, building, and/or within a predetermined area according to the detection data. The predetermined area may be set according to the boundaries of a home or building, geofencing data, motion data, a door position event, a distance from one or more sensors, and the like.

In determining the location of a user, the sensors 71, 72 can detect the location of one or more electronic devices (e.g., device 75) associated with a user. The one or more devices may be registered with the controller 73 and/or the remote system 74. As discussed above, sensors 71, 72 may communicate with another via Bluetooth signals, Bluetooth Low Energy (BTLE) signals, Wi-Fi pairing signals, near field communication (NFC) signals, radio frequency (RF) signals, infra-red signals, and/or short-range communication protocol signals. The device 75 may provide identifying information to the sensor 72, which may be provided to the controller 73 and/or the remote system 74 to determine whether the device 75 belongs to an authorized user of the security system disclosed herein. When the controller 73 and/or the remote system 74 determine that the device is an authorized device of the user, the controller 73 and/or the remote system 74 may determine the location of the device 75.

The sensors 71, 72 may be used determine whether the user associated with the device 75 can be identified with the device. For example, the sensors 71, 72 can determine whether an authorized user has a physical presence with the registered device (e.g., device 75), or whether an unauthorized person has possession of an authorized device. For example, as discussed above, a sensor 71, 72 having a camera can capture an image to determine if an authorized user has possession of the located device 75.

Alternatively, or in addition, the controller 73 and/or remote system 74, using the sensors 71, 72, may determine whether the located device 75 has been lost or mislaid, has been left at home while the user is out of the home, or is in the possession of an unauthorized user. When it is determined that the device 75 is lost, mislaid, or in the possession of an unauthorized user, a message may be sent to, for example, an application accessible by the user to notify them of the location of the lost or mislaid device 75, or alert them to the possession of their device 75 by an unauthorized user.

In some embodiments, the sensors 71, 72 can detect a location of the user is outside of the home, building, and/or predetermined area, and that a user's first electronic device (e.g., a smartphone, smart watch, wearable computing device, or the like) is within the home, building, and/or predetermined area. The controller 73 can determine whether to arm the alarm device 76 according one a location of a user's second electronic device (e.g., a key FOB, RFID tag, fitness band or sensor, or the like), geofencing data, and the detection data from the sensors 71, 72.

The security system disclosed herein includes an alarm device, such as the alarm device 76 illustrated in FIG. 2B and discussed above, which can be armed or disarmed by the controller 73 according to the determination as to whether the at least one user is occupying the home or building, and/or within the predetermined area.

For example, if the controller 73 determines that the members of a household (e.g., the users of the home security system) have exited the house (e.g., are no longer occupying the home or building, and are outside of the predetermined area), the controller 73 may arm the alarm device 76. After exiting, controller 73 may request confirmation from the user, via the device 75, to arm the alarm. The sensors 71, 72 may determine the location of the members of the household according to their respective electronic devices (e.g., smartphones, smart watch, wearable computing device, tablet computers, key FOBs, RFID tag, fitness band or sensor, and the like), according to images captured by the sensors, according to the sensors detecting one or more doors opening and closing, and the like.

For example, the sensors 71, 72 may detect one or more doors opening and/or closing, the controller 73 may determine an approximate location of a user, according to the location of the sensor for the door, and what direction the door was opened and/or closed in. The data generated by the door sensors 71, 72 regarding the directional opening of the door, as well as the location of the sensor, may be used along with other sensor data from sensors 71, 72 (e.g., motion data, camera images, sound data, and/or thermal data, and the like) to provide an improved location determination of the user.

Figure 3A:
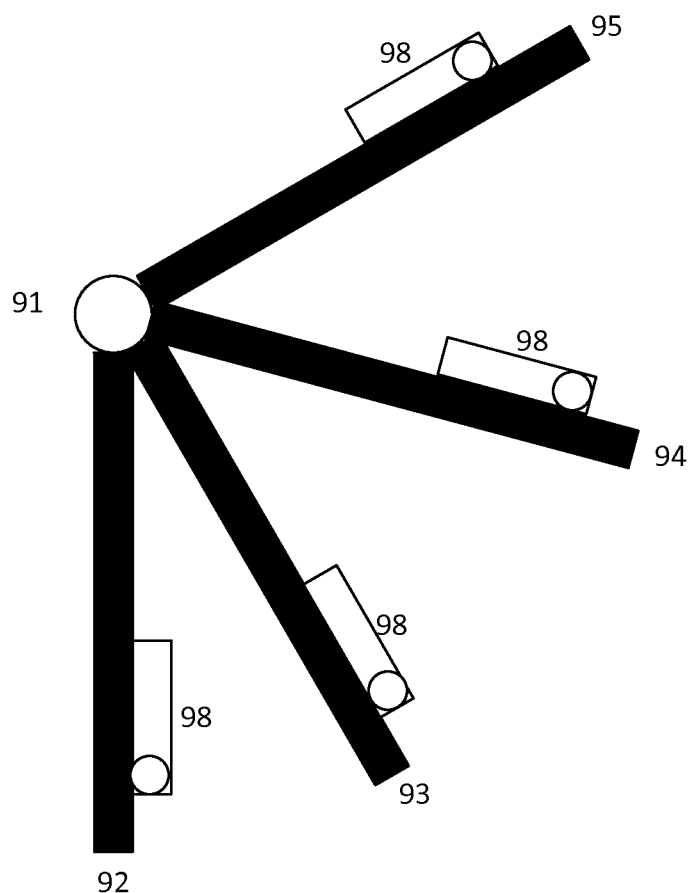
FIGS. 3A-3B show example sensors of the security system according to embodiments of the disclosed subject matter.

The security system may employ a magnetometer affixed to a door jamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the security system is activated, it may interpret such non-detection as the door being ajar or open. In some configurations, a separate sensor or a sensor integrated into one or more of the magnetometer and/or magnet may be incorporated to provide intelligence as to the status of the door. For example, an accelerometer and/or a compass may be affixed to the door and indicate the status of the door and/or augment the data provided by the magnetometer. FIG. 3A shows a schematic representation of an example of a door that opens by a hinge mechanism 81. In the first position 82, the door is closed and the compass 98 may indicate a first direction. The door may be opened at a variety of positions as shown 93, 94, 95. The fourth position 95 may represent the maximum amount the door can be opened. Based on the compass 98 readings, the position of the door may be determined and/or distinguished more specifically than merely open or closed. In the second position 93, for example, the door may not be far enough apart for a person to enter the home. A compass or similar sensor may be used in conjunction with a magnet, such as to more precisely determine a distance from the magnet, or it may be used alone and provide environmental information based on the ambient magnetic field, as with a conventional compass.

Figure 3B:
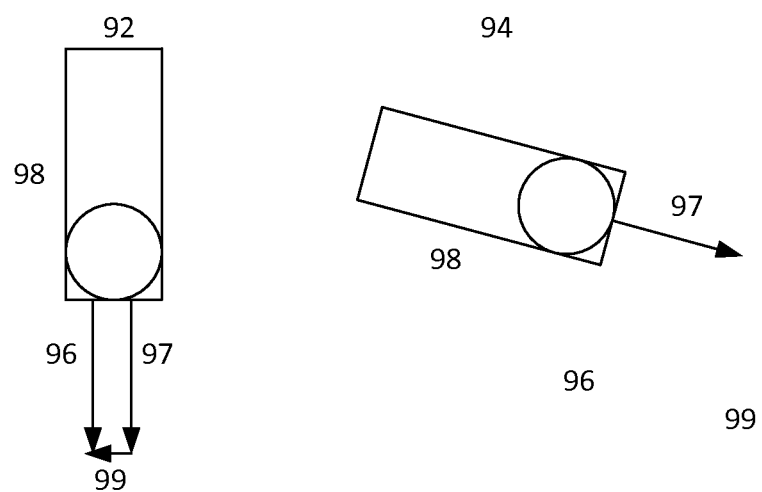

FIG. 3B shows a compass 98 in two different positions, 92, 94, from FIG. 3A. In the first position 92, the compass detects a first direction 96. The compass's direction is indicated as 97 and it may be a known distance from a particular location. For example, when affixed to a door, the compass may automatically determine the distance from the door jamb or a user may input a distance from the door jamb. The distance representing how far away from the door jamb the door is 99 may be computed by a variety of trigonometric formulas. In the first position 92, the door is indicated as not being separate from the door jamb (i.e., closed) 99. Although features 96 and 97 are shown as distinct in FIG. 3B, they may overlap entirely. In the second position 94, the distance between the door jamb and the door 99 may indicate that the door has been opened wide enough that a person may enter. Thus, the sensors may be integrated into a home security system, mesh network, or work in combination with other sensors positioned in and/or around an environment.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 73 and/or remote system 74 as previously described. The data may be analyzed to learn a user behavior, an environment state, and/or as a component of a home security or home automation system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, etc.

The controller 73 may aggregate detection data from the sensors 71, 72 and store it in a storage device coupled to the controller 73 or the network 70. The data aggregated by the controller 73 may be used to determine entrance and exit patterns (e.g., what days and times users enter and exit from the house, what doors are used, and the like) of the members of the household, and the controller 73 may arm or disarm the alarm device 76 according to the determined patterns.

In embodiments of the disclosed subject matter, one or more user electronic devices (e.g., device 75) can be registered with the processor, and the at least one of the sensors 71, 72 transmits a location request signal to the device 75. In response to the location request signal, the device 75 can transmits a location signal, and the controller 73 can determine the location of the device 75 according to the received location signal. The location request signal and the location signal can be Bluetooth signals, Bluetooth Low Energy (BTLE) signals, radio frequency (RF) signals, near field communications (NFC) signals, and the like.

The controller 73 can transmit a request message to be displayed by the device 75. The message may be, for example, a reminder to arm or disarm the alarm device 76. Upon displaying the message the electronic device receives input to arm or disarm the alarm device 76 according to the displayed request message, and transmits the received input to the controller 73 so as to control the alarm device 76. For example, the controller can request a code from the user to either arm or disarm the alarm device 76. When the user provides the code to the device 75, which correspondingly transmits the entered code to the controller 73, the controller 73 may control the arming or disarming of the alarm device 76. Alternatively, or in addition, the controller 73 can control the alarm device 76 to be automatically armed when the user is no longer occupying the home or building, and/or is outside of the predetermined area. Alternatively, or in addition, the controller may control the arming or disarming of the alarm device 76 according to a code that entered in a keypad that is communicatively coupled to the controller 73.

In embodiments of the disclosed subject matter, authentication requirements for arming or disarming of the alarm device 76 may be reduced when a device 75 is used to arm or disarm, and the device 75 is a registered device. When a button on the registered device 75 or displayed by the device 75 is used to arm or disarm the alarm device 76, the user may not have to enter a code, a shortened PIN code, a voice code, or the like.

When the sensors 71, 72 for an entry door to the home or building become disconnected from the network 70 and the controller 73, and the alarm device 76 is armed, the user may still re-enter the home. The security system may learn which doors are used by the user to enter and/or exit a home. The sensors 71, 72 associated with the doors that are used to enter and/or exit the home may store identifying information, so that the user may present a device 75 to the sensors 71, 72 to exchange identifying information to allow the user to enter the door. Once the user enters, the user may manually disarm the alarm device 76 by entering a security code.

The security system may learn the how the user typically arms and disarms the alarm device 76 (e.g., using a keypad, using the device 75, allowing for auto-arming, or the like). The device 75 may receive a message from the controller 73 when there is an attempt to disarm the alarm device 76 at a time of day and/or in a manner that is inconsistent with a user history or pattern for disarming. The controller 73 may request that the user of device 75 confirm whether the disarming is authorized, and may provide information from sensors 71, 72 (e.g., images captured of the person attempting the disarming) to assist in the confirmation. Via the device 75, the user may confirm or deny the request by the controller 73 to disarm the alarm device In embodiments of the disclosed subject matter, the alarm device 76 can be armed or disarmed by the controller 73 according to geo-location data from the sensors 71, 72 and/or the device 75. For example, if the sensors 71, 72 determine that the device 75 is physically located with an authorized user (e.g., as discussed above) according to geo-location data received from the device 75, and the user has exited the home and there are no other users in the home according to the sensors 71, 72, the controller 73 can automatically arm the alarm device. Alternatively, the controller may transmit a request message to the device 75 to determine if the user would like to arm the alarm device 76. For example, the message may display a selectable button to arm or disarm the alarm device 76. In another example, one or more sensors 71, 72 may determine the geo-location of an authorized user who is exiting the home, and may determine that one or more users are still located in the home according to geo-location data, and the controller 73 may refrain from arming the alarm device 76 to allow for the one or more users still in the home to exit. In yet another example, the sensors 71, 72 may determine the geo-location of an authorized user who has exited the home, and determine that one or more users are still located within the home, and the controller 73 may automatically arm the alarm device 76 to activate an audio and/or visual alarm when a defined outer perimeter is breached by an unauthorized user or when a door leading outside of the home is opened, but may not activate the alarm when doors internal to the home are opened or closed.

In some embodiments, the alarm device 76 can be armed or disarmed when the controller 73 determines that the device 75 and/or sensors 71, 72 are disconnected from the communications network 70 coupled to the alarm device 76. For example, if device 75 and/or sensors 71, 72 are disconnected from the network 70 so as to be decoupled from the controller 73 and/or remote system 74, the controller 73 may arm the alarm device 76. That is, the network 70 may be a wireless network having a predetermined communicative range within and/or around the perimeter of a house or building. When an authorized device 75 becomes decoupled from the network 70 (e.g., because the device 75 is outside of the predetermined communicative range) and/or the sensors 71, 72 become decoupled from the network 70, the controller 73 may automatically arm the alarm device 76.

In the security system disclosed herein, sensors 71, 72 can detect a security event, such as a door event (e.g., where a door to a house is opened, closed, and/or compromised) or a window event (e.g., where a window of a house is opened, closed, and/or compromised). For example, the sensors 71, 72 may have an accelerometer that identifies the force on the door or window as a compromising event. In another example, the sensors 71, 72 may contain an accelerometer and/or compass, and the compromising event may dislodge the sensor from the door or window, and the motion of the sensor 71, 72 may identify the motion as a compromising event. The controller 73 may activate the alarm device 76 according to whether the detected door event or window event is from an outside location (e.g., outside the house, building, or the like). That is, the controller 73 may control the alarm device 76 to output an audible alarm and/or message via a speaker when a door event or window event is detected by the sensors 71, 72. A light of the alarm device 76 may be activated so as to be turned on when one or more sensors 71, 72 detect a security event, such as a door or window event. Alternatively, or in addition, a light may be turned on and off in a pattern (e.g., where the light is turned on for one second, and off for one second; where the light is turned on for two seconds, and off for one second, and the like) when one or more sensors 71, 72 detect a security event such as the window and/or door event.

The controller 73 can control the alarm device 76 to be armed or disarmed according to a preset time period for a user to enter or exit a home or building associated with the security system. The predetermined time can be adjusted by the controller 73 according to the user. For example, as discussed herein, the controller 73 can aggregate data from the sensors 71, 72 to determine when a user enters and exits the home (e.g., the days and times for entry and exit, the doors associated with the entry and exit, and the like). For example, the controller 73 can adjust the amount of time for arming the alarm device 76 to be longer or shorter, according to the amount of time the user takes to exit the house according to the aggregated data.

In the security system disclosed herein the at least one sensor determines that the user is not occupying the home or building, and/or is outside of the predetermined area for a time greater than a preset time, the controller 73 can control the alarm device 76 to transition from a first security mode to a second security mode. The second security mode may provide a higher level of security than the first security mode. For example, the second security mode may be a "vacation" mode, where the user of the security system disclosed herein (e.g., the members of a household) are away from the house for a period of time (e.g., 1 day, 3 days, 5 days, 1 week, 2 weeks, 1 month, or the like). As discussed herein, the controller 73 may aggregate the detection data received from the sensors 71, 72 over a preset time (e.g., 1 week, 1 month, 6 months, 1 year, or the like) to determine a pattern for when the user is within the predetermined location or not.

Figure 4:
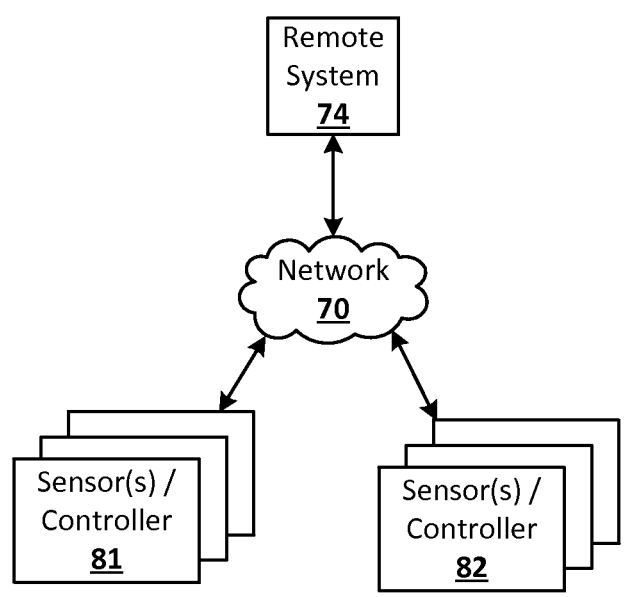
FIG. 4 shows a remote system to aggregate data from multiple locations having security systems according to an embodiment of the disclosed subject matter.

In some configurations, as illustrated in FIG. 4, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIGS. 2A-2B may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

For example, remote system 74 may gather and/or aggregate security event and/or environmental event data from systems 81, 82, which may be geographically proximally located to the security system illustrated in FIGS. 2A-2B. The systems 81, 82 may be located within one-half mile, one mile, five miles, ten miles, 20 miles, 50 miles, or any other suitable distance from the security system of a user, such as the security system shown in FIGS. 2A-2B. The remote system 74 may provide at least a portion of the gathered and/or aggregated data to the controller 73 and/or the device 75 illustrated in FIG. 2B.

The user of the device 75 may receive information from the controller 73 and/or the remote system 74 regarding a security event that is geographically proximally located to the user of the device 75 and/or the security system of a building (e.g., a home, office, or the like) associated with the user. Alternatively, or in addition, an application executed by the device 75 may provide a display of information from systems 81, 82, and/or from the remote system 74.

For example, an unauthorized entry to a building associated with systems 81, 82 may occur, where the building is within one-half mile from the building associated with the user of the device 75. The controller 73 and/or the remote system 74 may transmit a message (e.g., a security alert message) to the device 75 that an unauthorized entry has occurred in a nearby building, thus alerting the user to security concerns and/or potential security threats regarding their geographically proximally located building.

In another example, a smoke and/or fire event of a building associated with systems 81, 82 may occur, where the building is within 500 feet from the building associated with the user of the device 75. The controller 73 and/or the remote system 74 may transmit a message (e.g., a hazard alert message) to the device 75 that the smoke and/or fire event has occurred in a nearby building, thus alerting the user to safety concerns, as well as potential smoke and/or fire damage to their geographically proximally located building.

In situations in which the systems discussed here collect personal information about users, or may make use of personal information, the users may be provided with an opportunity to control whether programs or features collect user information (e.g., a user's current location, a location of the user's house or business, or the like), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Embodiments of the presently disclosed subject matter may be implemented in and used with a variety of computing devices. FIG. 5 is an example computing device 20 suitable for implementing embodiments of the presently disclosed subject matter. The computing device may be the device 75 illustrated in FIG. 2B and discussed above. The device 20 may be used to implement a controller, a device including sensors as disclosed herein, or the like. Alternatively or in addition, the device 20 may be, for example, a desktop or laptop computer, or a mobile computing device such as a smart phone, smart watch, wearable computing device, tablet, key FOB, RFID tag, fitness band or sensor, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen and/or lights (e.g., green, yellow, and red lights, such as light emitting diodes (LEDs) to provide the operational status of the security system to the user, as discussed above), a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide a communications link with the network 70, sensors 71, 72, controller 73, and/or the remote system 74 as illustrated in FIGS. 2A-2B. The network interface 29 may provide such connection using any suitable technique and protocol as will be readily understood by one of skill in the art, including digital cellular telephone, radio frequency (RF), Wi-Fi, Bluetooth®, Bluetooth Low Energy (BTLE), near-field communications (NFC), and the like. For example, the network interface 29 may allow the device to communicate with other computers via one or more local, wide-area, or other communication networks, as described in further detail herein.

Figure 6:
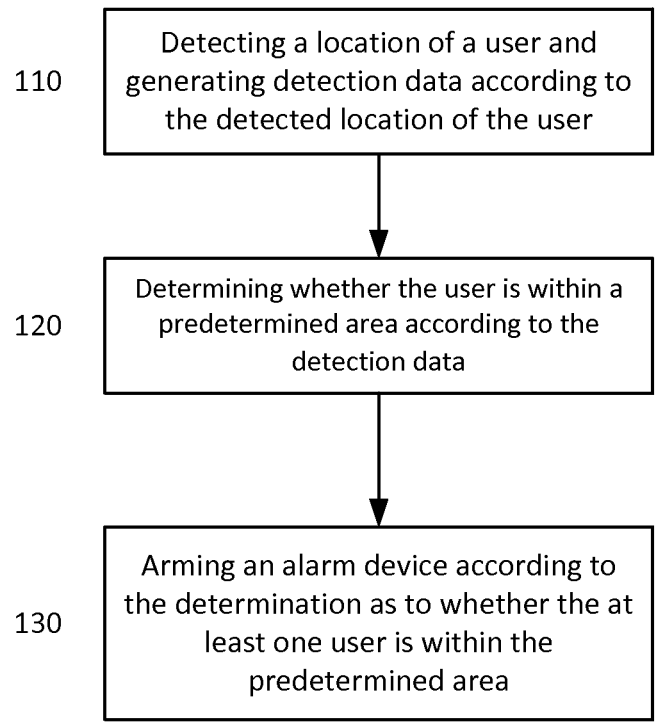
FIG. 6 shows example operations of an automated security method according to an embodiment of the disclosed subject matter.

FIG. 6 shows example operations of an automated security method 100 according to an embodiment of the disclosed subject matter. At least one of a plurality of sensors (e.g., sensors 71, 72 illustrated in FIGS. 2A-2B and discussed above) of the security system disclosed herein may detect a location of at least one user, and generate detection data according to the detected location of the at least one user at operation 110. A processor, such as controller 73 illustrated in FIGS. 2A-2B and described above, may receive the detection data from the sensors and determine whether the at least one user is occupying the home or building, and/or is within a predetermined area according to the detection data at operation 120. An alarm device (e.g., alarm device 76 illustrated in FIG. 2B and discussed above) may be armed according to the determination by the processor as to whether the at least one user is occupying the home or building, and/or is within the predetermined area at operation 130.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A security system comprising:
    a sensor to detect a location of at least one user, and generate detection data according to the detected location of the at least one user;
    a processor communicatively coupled to the sensor to receive the detection data, to determine whether the at least one user is occupying a building according to the detection data, and to aggregate the detection data received from the sensor to determine a pattern for when the user is entering or exiting the building; and
    an alarm device, communicatively coupled to at least the processor, that is armed or disarmed by the processor according to the determination as to whether the at least one user is occupying the building, and to provide a preset time period for the at least one user to enter or exit the building,
    wherein the preset time is adjusted by the processor based on the at least one user, a distance of the at least one user from an entrance or exit of the building, and the aggregated detection data.

2. The system of claim 1, wherein the sensor detects a location of the at least one user by detecting a location of an electronic device of the user.

3. The system of claim 1, wherein the processor controls the alarm device to be automatically armed when the at least one user is outside of the building.

4. The system of claim 1, wherein the sensor determines the location of the at least one user according to at least one selected from a group consisting of: a motion event, a door position event, and geofencing data.

5. The system of claim 1, wherein the alarm device is armed or disarmed by the processor according to geolocation data received from a device selected from the group consisting of: the sensor and an electronic device.

6. The system of claim 1, wherein the alarm device is armed or disarmed when the processor determines that an electronic device or the sensor is disconnected from a communications network coupled to the alarm device.

7. The system of claim 1, wherein the alarm device is armed or disarmed when the processor determines that an image captured by the sensor confirms the location of the at least one user.

8. The system of claim 1, wherein the alarm device is armed or disarmed by the processor according to user location history data aggregated by the processor and stored in a storage device coupled to the processor.

9. The system of claim 1, wherein the alarm device is disarmed by the processor when the at least one user is within the building and provides a security code from one of the group consisting of a keypad coupled to the processor and an electronic device.

10. The system of claim 1, wherein the building is defined by geofencing data.

11. The system of claim 1, wherein the processor activates the alarm based upon a door event or window event from an outside location detected by the sensor.

12. The system of claim 1, wherein, in response to the sensor detecting a location of the at least one user outside of the building, the processor determines whether to arm the alarm device according to one selected from the group consisting of: a location of an electronic device of the at least one user, geofencing data, and the detection data from the sensor.

13. The system of claim 1, wherein the processor controls the alarm device to be armed or disarmed according to the preset time period for a user to enter or exit, and the preset time is adjusted by the processor according to the at least one user.

14. The system of claim 1, wherein the processor controls the alarm device to transition from a first security mode to a second security mode when the at least one user is outside of the building for a time greater than a preset time.

15. The system of claim 1, wherein the processor aggregates the detection data received from the sensor over a preset time to determine a pattern for when the user is within a predetermined location.

16. The system of claim 1, wherein the at least one user is a plurality of users, and the sensor detects the respective locations of each of the plurality of users.

17. The system of claim 2, wherein the electronic device is selected from the group consisting of a smartphone, smart watch, wearable computing device, a tablet device, radio frequency identification (RFID) tag, fitness band, and a key fob.

18. The system of claim 2, wherein the electronic device is registered with the processor, and the sensor transmits a location request signal to the electronic device,
    wherein the electronic device transmits a location signal, and the processor determines the location of the electronic device according to the received location signal.

19. The system of claim 2, wherein the processor transmits a request message to be displayed by the electronic device, the electronic device receives input to arm or disarm the alarm device according to the displayed request message, and transmits the received input to the processor so as to control the alarm device.

20. The system of claim 13, wherein the processor extends the preset time period for a user to enter a security code via a keypad to disarm the alarm device when the sensor determines that the at least one user does not have a registered electronic device.

21. The system of claim 18, wherein the location request signal and the location signal are selected from a group consisting of: a Bluetooth signal, a Bluetooth Low Energy (BTLE) signal, a radio frequency (RF) signal, and a near field communications (NFC) signal.

22. A method comprising:
    detecting, by a sensor, a location of at least one user, and generating detection data according to the detected location of the at least one user;
    receiving, by a processor communicatively coupled to the sensor, the detection data, determining whether the at least one user is occupying a building according to the detection data, and aggregating the detection data received from the sensor to determine a pattern for when the at least one user is entering or exiting the building;
    arming an alarm device that is communicatively coupled to the processor according to the determination as to whether the at least one user is occupying the building;
    providing, by the alarm device, a preset time period for the at least one user to enter or exit the building; and adjusting, by the processor, the preset time based on the at least one user, a distance of the at least one user from an entrance or exit of the building, and the aggregated detection data.

23. The method of claim 22, wherein the detection of the location of the at least one user comprises:
detecting the location of the user by detecting the location of an electronic device of the user.

24. The method of claim 22, wherein the determining the location of the at least one user comprises:
determining the location of the at least one user according to at least one selected from a group consisting of: a motion event, a door position event, and geofencing data.

25. The method of claim 22, further comprising:
controlling, with the processor, the alarm device to be automatically armed when the at least one user is outside of the building.

26. The method of claim 22, further comprising:
arming or disarming the alarm device when the processor determines that an image captured by the sensor confirms the location of the at least one user.

27. The method of claim 22, further comprising:
arming or disarming the alarm device according to user location history data aggregated by the processor.

28. The method of claim 22, further comprising:
aggregating, with the processor, the detection data received from the sensor over a preset time; and
determining a pattern for when the user is within a predetermined location.

29. The method of claim 22, further comprising:
controlling the alarm device to be armed or disarmed according to the preset time period for a user to enter or exit,
wherein the predetermined time is adjusted by the processor according to the at least one user.

30. The method of claim 22, further comprising:
controlling the alarm device to transition from a first security mode to a second security mode when the at least one user is outside of the building for a time greater than a preset time.

31. The method of claim 23, further comprising:
registering the electronic device with the processor;
transmitting a location request signal from the sensor to the electronic device; and
determining the location of the electronic device according to a received location signal from the electronic device.

32. The method of claim 23, further comprising:
transmitting a request message to be displayed by the electronic device;
receiving input, with the electronic device, to arm or disarm the alarm device according to the displayed request message; and
transmitting the received input to the processor so as to control the alarm device.

33. The method of claim 29, further comprising:
extending, with the processor, the preset time period for a user to enter a security code via a keypad to disarm the alarm device when the sensor determines that the at least one user does not have a registered electronic device.

* * * * *